US006935176B2

(12) United States Patent
Goto et al.

(10) Patent No.: US 6,935,176 B2

(45) Date of Patent: Aug. 30, 2005

(54) CAPACITIVE DYNAMIC QUANTITY SENSOR DEVICE

(75) Inventors: Keisuke Goto, Obu (JP); Tameharu Ohta, Takahama (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/834,166

(22) Filed: Apr. 29, 2004

(65) Prior Publication Data

US 2004/0226376 A1 Nov. 18, 2004

(30) Foreign Application Priority Data

May 13, 2003 (JP) ....................................... 2003-134557

(51) Int. Cl.[7] .......................... G01P 15/125; H01G 7/00

(52) U.S. Cl. .................................... 73/514.32; 361/280

(58) Field of Search ......................... 73/514.32, 514.15, 73/514.24; 438/125; 257/724

(56) References Cited

U.S. PATENT DOCUMENTS 6,030,850 A 2/2000 Kurle et al. .................. 438/48
6,065,341 A 5/2000 Ishio et al. .............. 73/514.32
6,151,966 A 11/2000 Sakai et al. .............. 73/514.32
6,313,529 B1 * 11/2001 Yoshihara et al. .......... 257/724
2002/0019079 A1 * 2/2002 Kawai ........................ 438/125

FOREIGN PATENT DOCUMENTS

JP A-11-121767 4/1999

* cited by examiner

*Primary Examiner*—Hezron Williams
*Assistant Examiner*—Tamiko Bellamy
(74) *Attorney, Agent, or Firm*—Posz Law Group, PLC

(57) ABSTRACT

A sensor chip (100) includes comb-toothed movable electrodes (24) displaceable in a Y-direction, and comb-toothed stationary electrodes (30, 31, 40, 41) arranged to confront those movable electrodes (24), on one face side of a semiconductor substrate (10). The sensor chip (100) detects acceleration on the basis of a capacity change accompanying an acceleration application in the Y-direction between the movable electrodes (24) and the stationary electrodes (30, 31, 41, 42). The stationary electrodes (30, 31, 41, 42) are individually disposed to confront each other on one and other sides of the direction taken along the Y-direction in the individual movable electrodes (24). The individual electrode pads **(25*a*, 30*a*, 31*a*, 40*a*, 41*a*) and the circuit chip (200) are electrically connected by bump electrodes (300) so that one face of the substrate (10) confronts the circuit chip (200)**.

6 Claims, 5 Drawing Sheets

CAPACITIVE DYNAMIC QUANTITY SENSOR DEVICE

CROSS REFERENCE TO RELATED APPLICATION

This application is based upon, claims the benefit of priority of, and incorporates by reference the contents of Japanese Patent Application No. 2003-134557 filed on May 13, 2003.

FIELD OF THE INVENTION

The present invention relates to a dynamical quantity sensor and, more particularly, to a capacitive dynamical quantity sensor device.

BACKGROUND OF THE INVENTION

A conventional capacitive dynamical quantity sensor device is disclosed in JP-A-11-326365 (referred to as Patent Publication 1). The sensor device includes movable electrodes for being displaced in a predetermined direction in accordance with the application of a dynamical quantity, and stationary electrodes arranged to confront the movable electrodes, on one face side of a semiconductor substrate.

A general top plan construction of a sensor chip 100 in that capacitive dynamical quantity sensor device is shown in FIG. 6. FIG. 7 is a schematic section of the capacitive dynamical quantity sensor device, and shows the state, in which the sensor chip 100 is laminated and mounted over a circuit chip 200, in a section taken along line VII—VII of FIG. 6.

In this sensor chip 100, a semiconductor substrate 10 is trench-etched from its one face side to form trenches, thereby forming a movable portion composed of a beam portion 22 and movable electrodes 24 integrated with the former, and stationary electrodes 30 and 40 confronting the movable electrodes 24.

The beam portion 22 has a spring function to be displaced in the directions of arrow Y in FIG. 6 in accordance with the application of a dynamical quantity, and has a beam shape to extend in the direction perpendicular to the displacing directions Y. The movable electrodes 24 are formed integral with the beam portion 22 and are arrayed in plurality in the comb tooth shape along the displacing directions Y of the beam portion 22, so that they can be displaced together with the beam portion 22 in the displacing directions Y.

The stationary electrodes 30 and 40 are fixed and supported by the substrate 10 and are arrayed in plurality in such a comb tooth shape as to mesh with the spacings of the comb teeth in the movable electrodes 24. The side faces of the stationary electrodes 30 and 40 and the side faces of the movable electrodes 24 are arranged to confront each other.

The movable electrodes 24 and the individual stationary electrodes 30 and 40 are connected with wiring portions 25, 32 and 42, respectively. At predetermined positions over the wiring portions 25, 32 and 42, respectively, wire bonding pads 25*a*, 30*a* and 40*a* are formed.

Moreover, the individual pads 25*a*, 30*a* and 40*a* are electrically connected with the circuit chip 200 through bonding wires W1, W2 and W3, respectively. Here, FIG. 7 shows the connection mode by the bonding wire W1 exclusively for the pad 25*a* of the movable electrode 24, but the remaining pads 30*a* and 40*a* have similar connection modes.

Here, the capacity to be established in the spacing (or the electrode spacing) between the movable electrode 24 and the stationary electrode 30 on the left-hand side of FIG. 6 is designated by CS1, and the capacity to be established in the spacing (or the electrode spacing) between the movable electrode 24 and the stationary electrode 40 on the right hand is designated by CS2.

In this sensor chip 100, moreover, the capacities CS1 and CS2 between the left-hand and right-hand movable electrodes 24 and the stationary electrodes 30 and 40 change according to the application of the dynamical quantity. A signal based on that capacity difference (CS1–CS2) is outputted as an output signal from the sensor chip 100 and is processed in the circuit chip 200 and finally outputted. The dynamical quantity is thus detected.

However, in such a capacitive dynamical quantity sensor, only one stationary electrode 30 or 40 is arranged for each of the comb-toothed movable electrodes 24 as shown in FIG. 6.

An improvement in the sensitivity is desired for the capacitive dynamical quantity sensor device. Accordingly, the capacity between the movable electrodes and the stationary electrodes must be increased. For the increase in the capacity between the movable electrodes and the stationary electrodes, moreover, it is sufficient to enlarge the opposed areas between those electrodes.

Therefore, the inventors have contemplated increasing opposed areas between the electrodes by arranging two stationary electrodes in a manner to confront one of the comb-toothed movable electrodes. This contemplated design is shown in FIG. 8 and is labeled Related Art.

Specifically, each of the stationary electrodes 30, 31, 40 and 41 is arranged to confront each of one and other sides of the individual movable electrodes 24 along the comb tooth arraying direction of the movable electrodes 24. This construction of two stationary electrodes will be called the "two-side stationary electrode construction".

However, this two-side stationary electrode construction has an increased number of stationary electrodes. If the electrodes are to be led out for the wire bonding operation, the pattern for the lead-out wiring portions becomes complicated. On the other hand, the wiring portions could be formed in the substrate to lead out the electrodes. However, the structure is also complicated.

It is, therefore, conceivable that a wire boding could be done for each of the stationary electrodes 30, 31, 40 and 41 thereby to connect the result wires W and the circuit chip, as shown in FIG. 8. The circuit chip is omitted from FIG. 8.

In this case, however, the large number of wires W also complicates the construction. Therefore, this construction is not preferable because the wire bonding is hard or because the adjoining wires W may make contact with each other.

SUMMARY OF THE INVENTION

In view of the above-specified problems, therefore, the present invention has an object to realize the two-side fixed electrode construction properly with a simple construction in a capacitive dynamical quantity sensor device having a circuit chip assembled with a sensor chip having comb-toothed movable electrodes and stationary electrodes.

In order to achieve that object, according to a first aspect of the invention, there is provided a capacitive dynamical quantity sensor device comprising: a sensor chip including movable electrodes, which can be displaced in a predetermined direction in accordance with the application of a dynamical quantity, and stationary electrodes, which are arranged to confront the movable electrodes, on one face side of a semiconductor substrate, to thereby detect the dynamical quantity on the basis of a capacity change accompanying the application of the dynamical quantity between the movable electrodes and the stationary electrodes; and a circuit chip for processing an output signal from the sensor chip, wherein the movable electrodes are arrayed in plurality in a comb-tooth shape along the predetermined direction, wherein the stationary electrodes are arrayed in plurality in a comb-tooth shape to mesh with the spacings between the comb teeth of the movable electrodes, wherein the stationary electrodes are individually disposed to confront the movable electrodes individually on one and other sides of the direction along the predetermined direction, wherein one face of the semiconductor substrate in the sensor chip and the circuit chip are arranged to confront each other, and wherein the stationary electrodes and the movable electrodes are electrically connected with the circuit chip through bump electrodes.

According to the aspect of the invention, the sensor chip can be facedown mounted over the circuit chip to connect the movable electrodes and the stationary electrodes with the circuit chip through the bump electrodes.

Therefore, when the number of stationary electrodes is increased as in the two-side fixed electrode construction, the construction is not complicated as in the wire connection shown in the related art device of FIG. 8, so that the electric connections between the stationary electrodes (30, 31, 40 and 41) and the circuit chip (200) can be properly realized.

Therefore, the two-side fixed electrode construction can be properly realized with the simple construction in the capacitive dynamical quantity sensor device, in which the circuit chip is assembled with the sensor chip having the comb-toothed movable electrodes and stationary electrodes.

Here, according to another aspect of the invention, the bump electrodes can be connected separately and individually with the stationary electrodes disposed on one side of the direction along the predetermined direction in the movable electrodes, and the stationary electrodes disposed on the other side of the direction along the predetermined direction in the movable electrodes can be gathered in electrically common wiring portions, with which the bump electrodes are connected.

BRIEF DESCRIPTION OF THE DRAWINGS

The above and other objects, features and advantages of the present invention will become more apparent from the following detailed description made with reference to the accompanying drawings. In the drawings.

DESCRIPTION OF THE PREFERRED EMBODIMENT

The invention will be described in connection with an embodiment with reference to the accompanying drawings. In this embodiment, the invention is applied to a differential capacitive semiconductor acceleration sensor device (or a capacitive acceleration sensor device) as a capacitive dynamical quantity sensor device.

Figure 1:
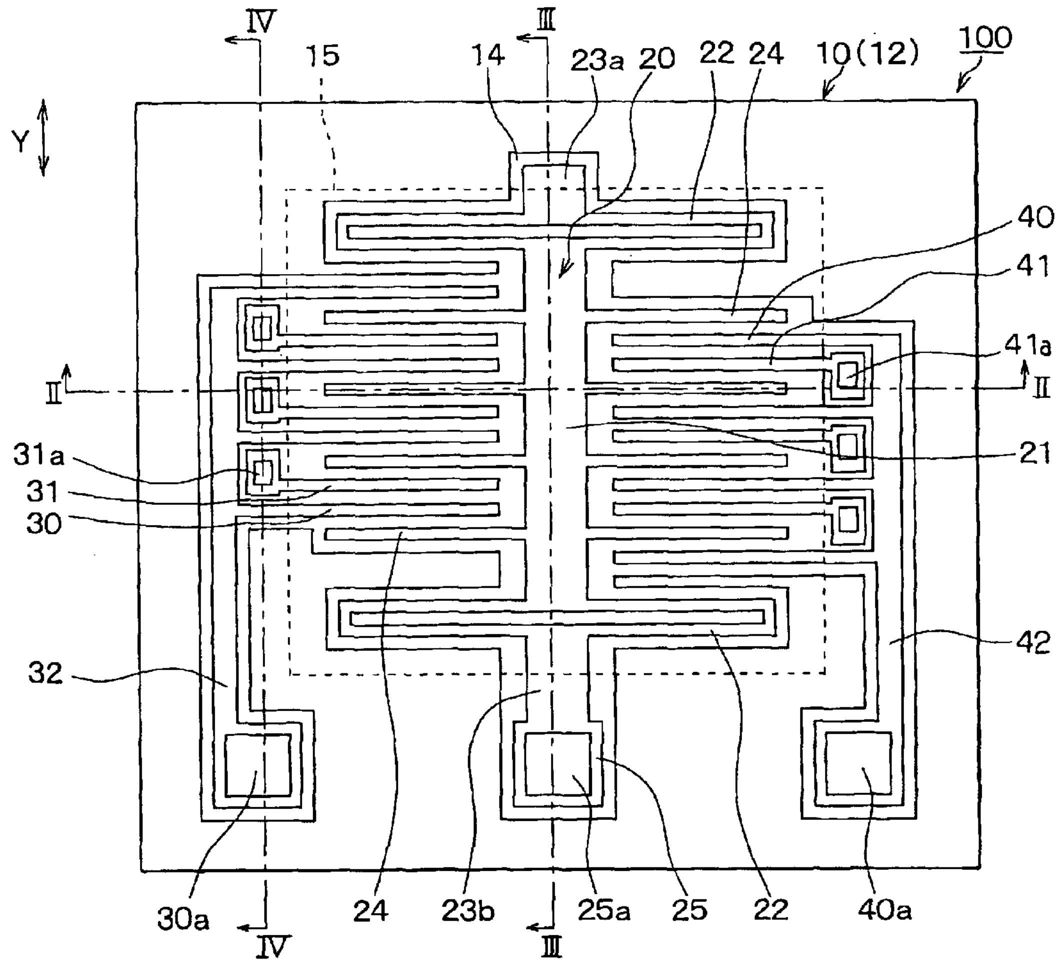
FIG. 1 is a schematic top plan view of a sensor chip in a capacitive acceleration sensor device according to an embodiment of the invention.
Figure 2:
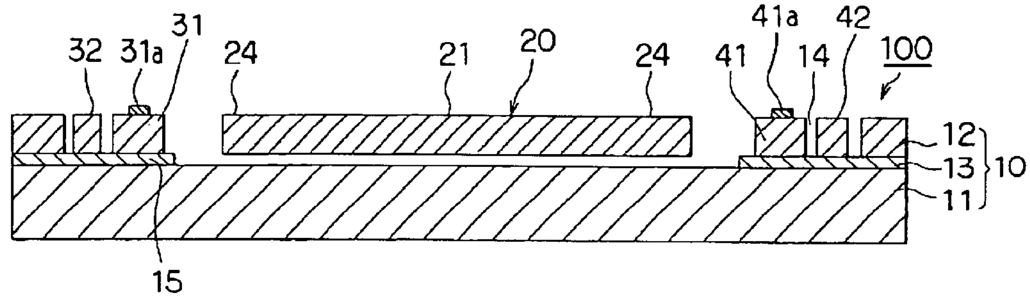
FIG. 2 is a schematic sectional view of the sensor chip taken along line II—II of FIG. 1.
Figure 3:
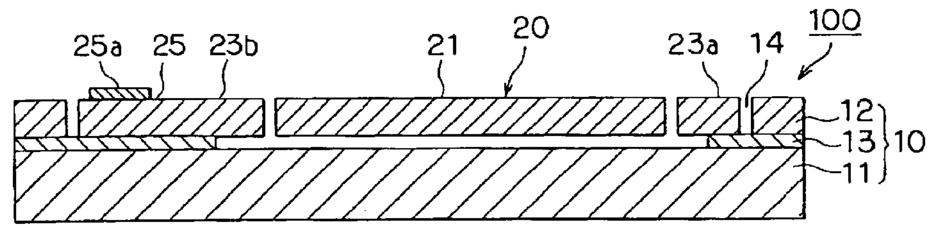
FIG. 3 is a schematic sectional view of the sensor chip taken along line III—III of FIG. 1.
Figure 4:
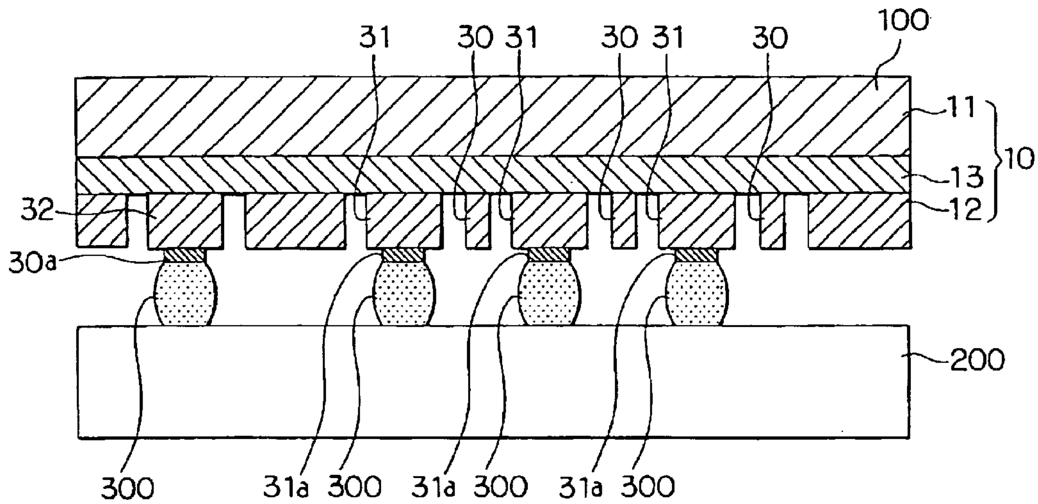
FIG. 4 is a schematic sectional view showing the state in which the sensor chip is mounted and taken along line IV—IV of FIG. 1.

FIG. 1 is a schematic top plan view of a sensor chip 100 in a capacitive acceleration sensor device according to this embodiment; FIG. 2 is a schematic section of the sensor chip 100 taken along line II—II of FIG. 1; FIG. 3 is a schematic section of the sensor chip 100 taken along line III—III of FIG. 1; and FIG. 4 is a schematic section showing the state, in which the sensor chip 100 is mounted in a circuit chip 200, and taken along line IV—IV of FIG. 1.

This capacitive acceleration sensor device can be applied to an automotive acceleration sensor for controlling the actions of an airbag, an ABS or a VSC, a gyro sensor, etc.

The sensor chip 100 may be formed by conventional fabrication techniques. This semiconductor substrate 10 constructing the sensor chip 100 is a rectangular SOI substrate 10 having an oxide film 13 acting as an insulating layer between a first silicon substrate 11 acting as a first semiconductor layer and a second silicon substrate acting as a second semiconductor layer, as shown in FIGS. 2 and 3.

Trenches 14 are formed in the second silicon substrate 12 to form a beam structure having a comb shape including a movable portion 20 and stationary portions 30 and 40. Of the oxide film 13, moreover, the portions corresponding to the regions having the beam structures 20 to 40 are rectangularly removed to form an aperture portion 15.

This sensor chip 100 is manufactured in the following manner. A mask shaped to correspond to the beam structure is formed by the photolithography over the second silicon substrate 12 of the SOI substrate 10, and the trenches 14 are then formed with a gas of $CF_4$ or $SF_6$ by a trench etching such as a dry etching thereby to the beam structures 20 to 40 together. Subsequently, the oxide film 13 is removed by a sacrificial layer etching or the like using hydrofluoric acid to form the aperture portion 15.

The movable portion 20 arranged to cross over the aperture portion 15 is constructed such that the two ends of a weight portion 21 of a slender rectangular shape are integrally connected through a beam portion 22 to anchor portions 23*a* and 23*b*. These anchor portions 23*a* and 23*b* are fixed on the open edge portion of the aperture portion 15 in the oxide film 13 and are supported over the first silicon substrate 11 acting as the support substrate as shown in FIG. 3. As a result, the weight portion 21 and the beam portion 22 confront the aperture portion 15.

The beam portion 22 is formed into a rectangular frame shape having two parallel beams connected at their two ends, and has a spring function for being displaced in the direction perpendicular to the longitudinal direction of the two beams. Specifically, the beam portion 22 displaces the weight portion 21 in the directions of arrows Y of FIG. 1, when it is subject to an acceleration containing a component in the Y-directions, and restores its original state as the acceleration disappears.

Therefore, the movable portion 20 can be displaced over the aperture portion 15 in the displacing directions of the beam portion 22, that is, in the aforementioned Y-directions in accordance with the application of the acceleration. The Y-directions will be called the displacing directions Y of the beam portion 22.

Moreover, the movable portion 20 is provided with comb-toothed movable electrodes 24. These movable electrodes 24 are composed of a plurality of beam-shaped electrodes extending away from the two side faces of the weight portion 21 in the directions perpendicular to the displacing directions Y of the beam portion 22.

In other words, the movable electrodes 24 are arrayed in plurality in a comb-tooth shape along the displacing directions Y of the beam portion 22. In FIG. 1, the four movable electrodes 24 are formed to protrude individually from the left-hand and right-hand sides of the weight portion 21 so that they are formed into a beam shape having a rectangular section to confront the aperture portion 15.

Thus, the individual movable electrodes 24 are formed integral with the beam portion 22 and the weight portion 21 so that they can move together with the beam portion 22 and the weight portion 21 in the displacing directions Y of the beam portion 22.

The stationary portions 30, 31, 32, 40, 41 and 42 are supported by such another set of the opposed side portions at the open edge portion of the aperture portion 15 in the oxide film 13 rather than the anchor portions 23*a* and 23*b*.

In FIG. 1, the stationary portions 30, 31 and 32 located on the left-hand side of the weight portion 21 are the first left-hand stationary electrode 30, the second left-hand stationary electrode 31 and the first left-hand stationary electrode wiring portion 32. In FIG. 1, on the other hand, the stationary portions 40, 41 and 42 located on the right-hand side of the weight portion 21 are the first right-hand stationary electrode 40, the second right-hand stationary electrode 41 and the first right-hand stationary electrode wiring portion 42.

Figure 8:
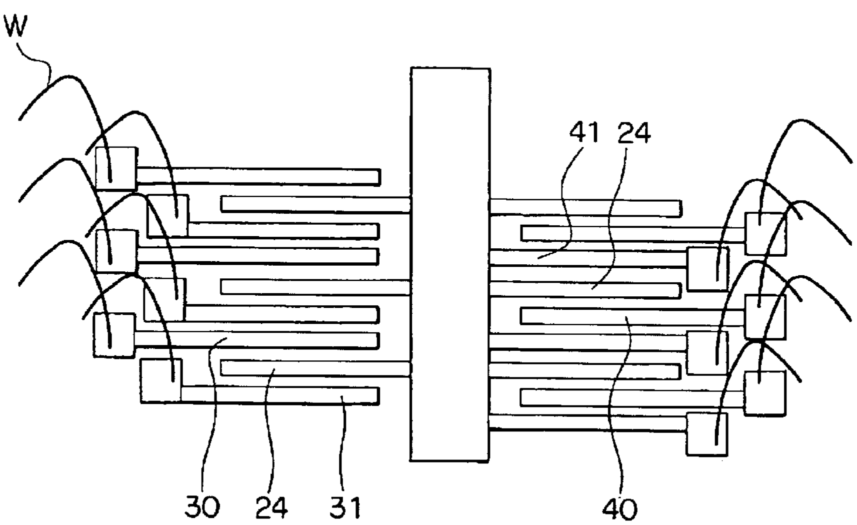
FIG. 8 is a schematic top plan view showing a related art two-side fixed electrode construction.

The individual stationary electrodes 30, 31, 40 and 41 are arrayed in plurality in such a comb-tooth shape to be entangled with the clearances of the comb teeth in the movable electrodes 24. Moreover, the sensor chip 100 of this embodiment adopts the aforementioned "two-side fixed electrode construction" discussed above with respect to FIG. 8.

In FIG. 1, more specifically, on the left-hand side of the weight portion 21, one first left-hand stationary electrode 30 is disposed for each movable electrode 24 on the upper side of the direction along the displacing directions Y of the beam portion 22. The second left-hand stationary electrode 31 is disposed on the lower side of the same direction.

In FIG. 1, on the other hand, on the right-hand side of the weight portion 21, one second right-hand stationary electrode 41 is disposed for each movable electrode 24 on the upper side of the direction along the displacing directions Y of the beam portion 22. The first right-hand stationary electrode 40 is disposed on the lower side of the same direction.

Thus, for each movable electrode 24, the stationary electrodes 30, 31, 40 and 41 are individually disposed to confront each other on one and other sides along the displacing directions Y of the beam portion 22. At each opposed spacing, a detection spacing for detecting the capacity is formed between the side face of the movable electrode 24 and the side faces of the stationary electrodes 30, 31, 40 and 41.

On the other hand, the individual stationary electrodes 30, 31, 40 and 41 are electrically independent of each other. Moreover, the individual stationary electrode 30, 31, 40 and 41 are formed in a beam shape of a rectangular section extending generally in parallel with the movable electrode 24.

Here, the first left-hand stationary electrode 30 and the first right-hand stationary electrode 40 are individually supported in a cantilever shape by the stationary electrode wiring portions 32 and 42, respectively. In short, the respective group of the first left-hand stationary electrodes 30 and the first right-hand stationary electrodes 40 is gathered into the electrically common wiring portions 32 and 42.

On the other hand, the second left-hand stationary electrode 31 and the second right-hand stationary electrode 41 are individually isolated electrically through the trenches 14, and are supported in a cantilever shape over the oxide film 13 in the open edge portion of the aperture portion 15.

On the other hand, stationary electrode pads 30*a* and 40*a* are individually formed at predetermined positions over the first left-hand stationary electrode wiring portion 32 and the first right-hand stationary electrode wiring portion 42. For the second left-hand stationary electrode 31 and the second right-hand stationary electrode 41, on the other hand, stationary electrode pads 31*a* and 41*a* are individually formed at the support portions positioned at the open edge portion of the aperture portion 15.

On the other hand, a movable electrode wiring portion 25 is formed such that it is connected integrally with one anchor portion 23*b*, and has a movable electrodes pad 25*a* formed at a predetermined position over the wiring portion 25. The individual electrode pads 25*a*, 30*a*, 31*a*, 40*a* and 41*a* thus far described are formed by sputtering or depositing aluminum, for example.

Figure 5:
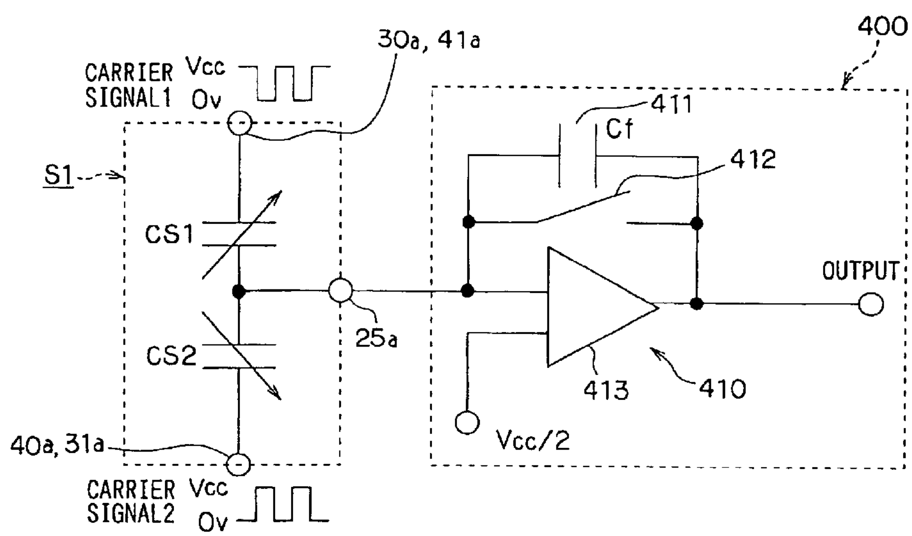
FIG. 5 is a detecting circuit diagram of the capacitive acceleration sensor device according to a preferred embodiment.
Figure 6:
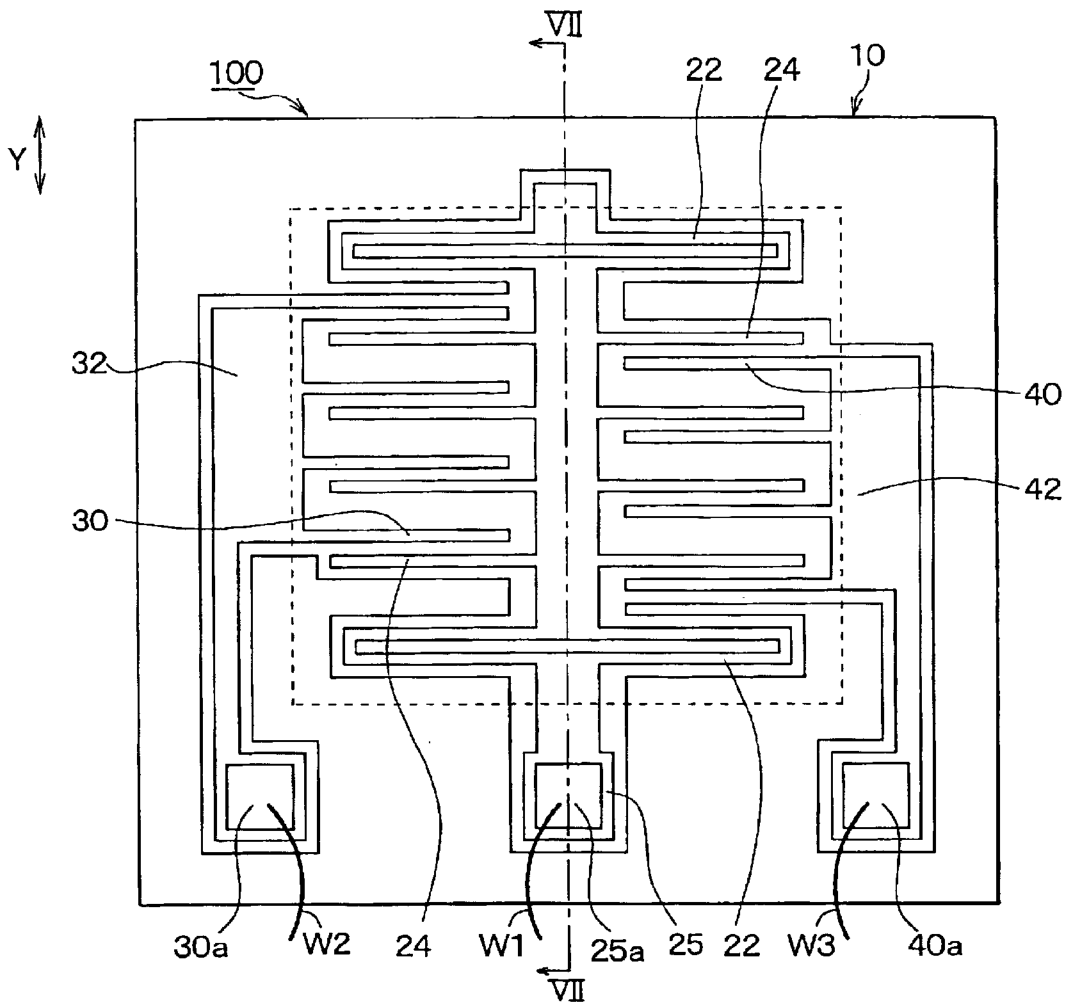
FIG. 6 is a schematic top plan construction of a sensor chip in a prior art capacitive dynamic quantity sensor device.
Figure 7:
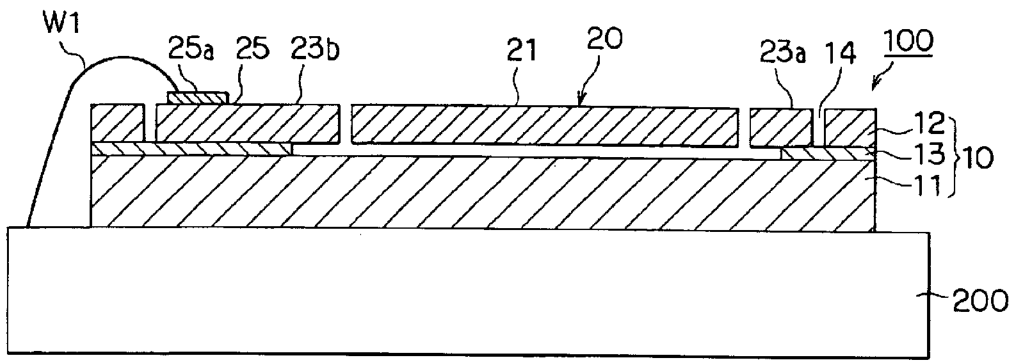
FIG. 7 is a schematic section of the sensor chip of FIG. 6 taken along line VII—VII.

As shown in FIG. 4, the sensor chip 100 thus constructed is arranged and mounted over the circuit chip 200 so that one face of the semiconductor substrate 10 in the sensor chip 100 and the circuit chip 200 confront each other. In this circuit chip 200, a detecting circuit (as shown in FIG. 5) for processing the output signal from the sensor chip 100 is formed over the semiconductor substrate.

The individual stationary electrode pads 30*a*, 31*a*, 40*a* and 41*a* connected with the stationary electrodes 30, 31, 40 and 41, and the movable electrode pad 25*a* are electrically connected with the not-shown electrodes over the circuit chip 200 through bump electrodes 300. These bump electrodes 300 can adopt the ordinary bumps such as solder bumps. It should be noted that the bumps 300 are not limited to the protruding structure shown. More fully, the bumps may be implemented by, for example, flat non-protruding electrodes and solder.

In short, in this embodiment, the sensor chip 100 having the two-side fixed electrode construction is facedown mounted over the circuit chip 200 so that the stationary electrodes 30, 31, 40 and 41 and the movable electrode wiring portion 25 are electrically connected with the circuit chip 200 through the bump electrodes 300.

In this embodiment, the separate bump electrodes 300 are individually connected with the stationary electrodes 31, 41 disposed on one side in the directions along the displacing directions Y of the beam portion 22 in the movable electrodes 24, as shown in FIG. 4. The stationary electrodes 30 and 40 disposed on the other side of the same direction in the movable electrodes 24 are gathered into the electrically common wiring portions 32 and 42, with which the bump electrodes 300 are connected.

The present capacitive acceleration sensor device thus having the sensor chip 100 and the circuit chip 200 can be assembled, for example, by feeding the solder bumps over the electrodes of the circuit chip 200 and then by mounting the sensor chip 100 over the circuit chip 200 to reflow the solder.

Here, the detecting actions of the present capacitive acceleration sensor device will be discussed. As described above, the individual stationary electrodes 30, 31, 40 and 41 are disposed to confront each other on one and other sides of the individual movable electrodes 24 in the directions along the displacing directions Y of the beam portion 22. At each opposed spacing, a detection spacing for detecting the capacity is formed.

It is assumed that a first capacity CS1 is formed in the spacing between the first left-hand stationary electrode 30 and the movable electrode 24 and in the spacing between the second right-hand stationary electrode 41 and the movable electrode 24, and that a second capacity CS2 is formed in the spacing between the second left-hand stationary electrode 31 and the movable electrode 24 and in the spacing between the first right-hand stationary electrode 40 and the movable electrode 24.

When an acceleration is received, moreover, the movable portion 20, with the exception of the anchor portions, is integrally displaced in the displacing directions Y of the beam portion 22 by the spring function of the beam portion 22 so that the individual capacities CS1 and CS2 change according to the displacement of the movable electrode 24.

For example, when the movable portion 20 is displaced downward in FIG. 1 along the displacing directions Y of the beam portion 22, the spacing between the first left-hand stationary electrode 30 and the movable electrode 24 and the spacing between the second right-hand stationary electrode 41 and the movable electrode 24 are widened. On the contrary, the spacing between the second left-hand stationary electrode 31 and the movable electrode 24 and the spacing between the first right-hand stationary electrode 40 and the movable electrode 24 are narrowed.

Therefore, the acceleration can be detected on the basis of the change in the differential capacity (CS1−CS2) due to the movable electrodes 24 and the stationary electrodes 30, 31, 40 and 41. Specifically, a signal based on that capacity difference (CS1−CS2) is outputted as an output signal from the sensor chip 100 and is processed in the circuit chip 200 and finally outputted.

FIG. 5 is a circuit diagram showing a detecting circuit 400 in the present capacitive acceleration sensor device. In this detecting circuit 400, reference numeral 410 designates a switched capacitor circuit (or an SC circuit), which is provided with a capacitor 411 having a capacity Cf, a switch 412 and a differential amplifier circuit 413 so that it converts the capacity difference (CS1−CS2) inputted into a voltage.

In this sensor device, for example, a carrier wave 1 having an amplitude Vcc is inputted from the stationary electrode pads 30*a* and 41*a*, and a carrier wave 2 having a phase shifted 180 degrees from the carrier wave 1 is inputted from the stationary electrode pads 40*a* and 31*a*, and the switch 412 of the SC circuit 410 is turned ON/OFF at a predetermined timing.

The applied acceleration is outputted as a voltage value V0, as expressed by the following Formula 1:

$$V0=(CS1-CS2)\cdot Vcc/Cf. \quad \text{[Formula 1]}$$

In these detecting actions, this embodiment adopts the two-side fixed electrode construction to increase the opposed areas between the electrodes so that the first capacity CS1 and the second capacity CS2 are larger by two times than those of the general construction, in which one movable electrode and one stationary electrode confront each other. This results in an excellently sensitive detection.

Here according to this embodiment, the sensor chip 100 is facedown mounted over the circuit chip 200, and the movable electrodes 24 and the stationary electrodes 30, 31, 40 and 41 are connected with the circuit chip 200 through the bump electrodes 300.

Even when the number of the stationary electrodes 30, 31, 40 and 41 is increased as in the two-side fixed electrode construction, therefore, the electric connections between the stationary electrodes 30, 31, 40 and 41 and the circuit chip 200 can be properly realized without adopting any complicated construction such as the wire connection of the related art.

According to this embodiment, therefore, the two-side fixed electrode construction can be realized by the simple construction in the capacitive dynamical quantity sensor device having the circuit chip assembled with the sensor chip having the comb-toothed movable electrodes and the stationary electrodes.

In a modification, although not shown, the first left-hand stationary electrode 30 and the first right-hand stationary electrode 40 are not gathered in to the electrically common wiring portions 32 and 42, but may be made electrically independent of each other like the second left-hand stationary electrode 31 and the second right-hand stationary electrode 41 and may be individually supported in a cantilever shape on the open edge portion of the aperture portion 15.

The present invention can be applied not only to the acceleration sensor but also to a dynamical quantity sensor such as an angular velocity sensor.

What is claimed is:

1. A capacitive dynamic quantity sensor device comprising:

a sensor chip including movable electrodes displaceable in a predetermined direction in accordance with application of a dynamical quantity, and stationary electrodes arranged to confront the movable electrodes, on one face side of a semiconductor substrate, to thereby detect the dynamic quantity on the basis of a capacity change accompanying the application of the dynamic quantity between the movable electrodes and the stationary electrodes; and a circuit chip for processing an output signal from the sensor chip, wherein the movable electrodes are arrayed in plurality, wherein the stationary electrodes are arrayed in plurality to confront the movable electrodes, wherein one face of the sensor chip and the circuit chip are arranged to confront each other, and wherein each of the stationary electrodes has a stationary electrode pad with a bump formed thereon to electrically connect with the circuit chip.

2. A capacitive dynamic quantity sensor device according to claim 1, wherein the bump electrodes are connected separately and individually with the stationary electrodes disposed on one side of the direction along the predetermined direction in the movable electrodes, and wherein the stationary electrodes disposed on the other side of the direction along the predetermined direction in the movable electrodes are gathered in electrically common wiring portions, with which the bump electrodes are connected.

3. A capacitive dynamic quantity sensor device according to claim 1, wherein the movable electrodes have a comb-tooth shape along the predetermined direction, wherein the stationary electrodes also have a comb-tooth shape to thereby mesh with the movable electrodes, wherein the stationary electrodes are individually disposed to confront the movable electrodes on one and other sides of the direction along the predetermined direction, and wherein the stationary electrodes and the movable electrodes are electrically connected with the circuit chip through bump electrodes.

4. A capacitive dynamic quantity sensor device according to claim 1, wherein the stationary electrodes are connected together by a wiring portion.

5. A capacitive dynamic quantity sensor device comprising:

a circuit chip for processing an output signal; and a sensor chip confronting the circuit chip, the circuit chip comprising:

a plurality of movable electrodes displaceable in a predetermined direction in accordance with application of a dynamic quantity;

a plurality of first stationary electrodes arranged to confront the movable electrodes on a first side of the movable electrodes; and a plurality of second stationary electrodes arranged to confront the movable electrodes on a second side of the movable electrodes, wherein the first stationary electrodes and the second stationary electrodes are arranged so that a first electrical capacity induced between the first stationary electrodes and the movable electrodes is different than a second electrical capacity induced between the second stationary electrodes and the movable electrodes to thereby detect the dynamic quantity on the basis of a differential capacity change between the first and second electrical capacities accompanying the application of the dynamic quantity between the movable electrodes and the first and second stationary electrodes, wherein each of the first and second stationary electrodes has a stationary electrode pad with a bump formed thereon to electrically connect with the circuit chip.

6. A capacitive dynamic quantity sensor device according to claim 1, wherein the first stationary electrodes are connected together by a wiring portion, wherein each of the second stationary electrodes has an independent wiring portion.

* * * * *